Feb. 4, 1964
E. McDERMOTT
3,120,428
GEOCHEMICAL EXPLORATION
Filed March 11, 1959
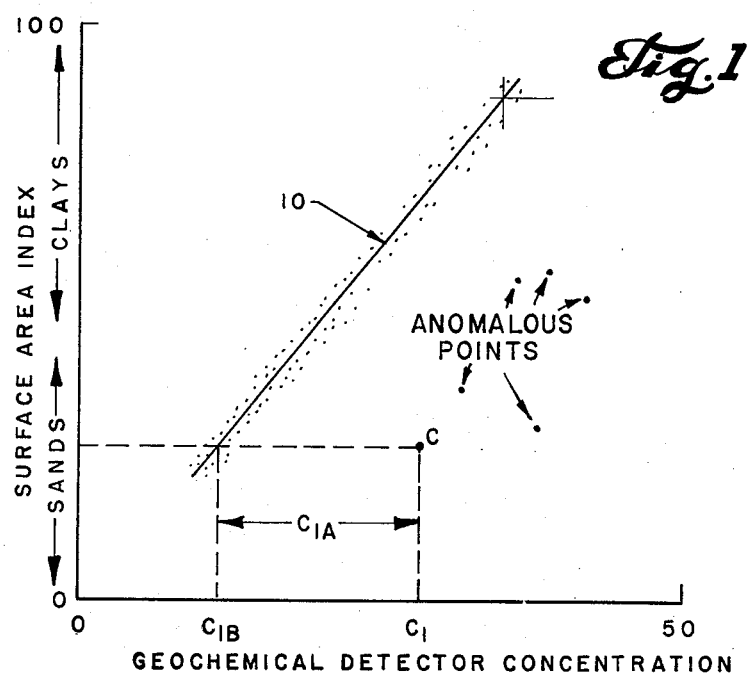
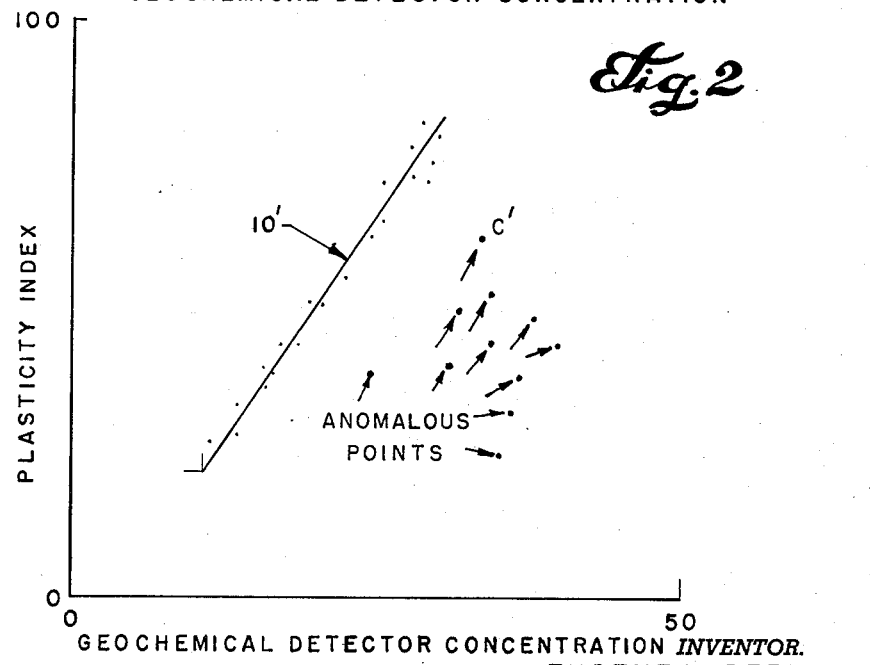
INVENTOR.
EUGENE McDERMOTT
BY
*Stevens, Davis, Miller & Mosher*
ATTORNEYS

United States Patent Office 3,120,428
Patented Feb. 4, 1964

3,120,428
GEOCHEMICAL EXPLORATION
Eugene McDermott, 4701 Drexel Ave., Dallas, Tex.
Filed Mar. 11, 1959, Ser. No. 798,741
4 Claims. (Cl. 23—230)

This invention relates generally to the art of exploration for buried oil and gas deposits by means of geochemical methods, and more particularly to a method of correcting the anomalies of a geochemical survey for variations in ground composition whereby a true indication of underground petroleum deposits may be obtained.

The purpose of this invention is to make corrections for these variations in composition. To date the various methods of geochemical exploration have been severely handicapped by the inability to do this.

It is, therefore, a primary object of this invention to provide a method of a geochemical survey in which the measurements of surface anomalies of a geochemical survey are corrected for the inherent variations of entrapping and holding capacities of the various soils present in the analyzed samples, as well as the permeability of the ground which controls the leaching effect due to rainfall and surface waters.

A further object is to provide a method in which the plasticity of the soil is determined as a basis of measurement of the entrapping capacity of the soil.

Another object is to provide a method in which the surface area of the soil particles of the sample are measured and this measurement is utilized to properly adjust the concentration values of the samples.

These and other objects and advantages will be apparent from an examination of the following specification when taken in conjunction with the drawing in which:

FIG. 1 is a chart showing a graph for determining correction values for one condition of composition of the soil such as the internal and external surface area of the particles; and FIG. 2 is a graph showing correction values for plasticity of the soil samples.

One basis for geochemical prospecting is the fact that underground gases, associated with petroleum deposits, rise to or near the surface of the earth where they may be measured at the surface or in shallow holes drilled for this purpose. The presence of this gas being then indicative of the presence of a nearby petroleum deposit. It has also been found that the gases including hydrocarbons migrate through underground water which contain minerals and as a result, these minerals are transported to or near the surface and deposited there. These gases and minerals mix with the earth, the principal constituents of which are sands, clays and carbonates in the process of rising to the surface strata, and their presence when detected by any known method tends to indicate a petroleum deposit. The measurement of these minerals and compounds will be referred to in this specification as their "concentrations."

High concentrations of hydrocarbons and various minerals are found to occur in samples taken from shallow bore holes over buried petroleum deposits; and conventional methods may be employed for measuring the concentrations of these described detector concentrations. In my prior patents, No. 2,590,113, issued March 25, 1952, No. 2,371,637, issued March 20, 1945, and No. 2,367,592, issued January 16, 1945, I have described in detail certain methods of analyzing the chemical content of the surface samples for these minerals so that an indication will be had of high concentrations that occur over the buried oil or gas deposit. These minerals and other chemicals in the near surface soil are known as "detectors." In my earlier patents, no particular significance was accorded the presence of lamellar soils having a large internal and external surface area and particularly clays; however, I have subsequently discovered that a clay particle will pick up and hold a much greater concentration of the named geochemical detectors than will an equivalent amount of sand, carbonates, or other granular soil. Therefore, prior geochemical prospecting methods which merely analyzed the soil samples for such granular materials and related these analyses to location of areas on a map were in error by this factor, since none of these methods included the specific physical steps of analyzing the soil samples for their clay content.

Variations in these detector concentrations also occur as a result of variations in the composition (which is an operational definition of texture; the latter being frequently used without adequately being defined) of the material near the surface of the ground in which the samples are taken. These materials are composed principally of three main components, namely, clays, which are lamellar in structure, and carbonates and sands, which are granular in structure. For the purposes of this invention a description of a sample in terms of the relative proportions of any or all of these three ingredients will be referred to as its "composition."

The clays, especially the mortmorillanite type, occur in the smallest particle sizes, whereas the sands, in general, contribute the largest particle sizes. Consequently, the clays contribute the largest surface area per unit of sample, whereas the sands contribute the least amount of surface area and the carbonates have a surface area which is intermedite that of the other two components. The thickness of a single layer of the clay lattice is only $\frac{1}{1000}$ micron. These layers flocculate into aggregates of varying sizes. The surface areas of a mortmorillonite clay is very large. As an example in a fraction where the largest aggregated particle is 0.2 micron the internal surface area is 650 square meters per gram. The external surface area of the aggregates is 15 square meters per gram. In comparison a very fine sand would have a surface area much less than the external area of the clay. Fine sands fall in the particle range, 20–200 microns. (So it is apparent why clays play such an important role in soils.) The mortmorillonite clays have surface areas thousands of times the surface areas of fine sands. Other clays such as kaolinites have surface areas hundreds of times the surface areas of fine sands.

The composition of the samples in terms of the relative quantities of these three components may be determined by various methods which are known in the art and include the following:

(1) Sedimentation test will distinguish between fine and coarse particle size;

(2) X-ray diffraction, differential thermal analysis, and electron microscopy will determine proportions of the three named components provided the percentages are large enough to measure by these methods.

I have found that the relation between the various compositions of the samples and the various detector concentrations in the samples may be empirically determined, and once determined the variations due to the compositions can be corrected for, and when corrected, the remaining anomaly values will then give a true indication of underground petroleum deposits, and not merely an indication of the ability of a particular soil sample to hold detector concentrations.

I have also found that the quantities of the various concentrations are directly related to the surface area of the sample, and inversely related to the particle size. Since clays possess these properties, they will show a higher concentration of detectors than will either carbonates or sands. This high showing is referred to as the background value of the sample. Thus, this background value may be determined by measuring the surface area of the sample, and this measurement may be accomplished by determining the amounts of a polar gas, such as water vapor, ammonia or glycerol, which are absorbed by the sample.

When the values of surface area are obtained and are plotted against concentration values of the same sample (or a sample taken from the same location in the earth), a graph such as shown in FIG. 1 will result. From this graph a background line as shown at 10 may be drawn through the prominent cluster of plotted points. Any values such as C which are removed from their expected (background) value are anomalous and provide a true indication when corrected for their background value of $C_{1B}$. Thus, the value $C_{1A}$ is the corrected concentration value.

I have also found that the quantities of the various concentrations are directly related to the plasticity of the sample. By measuring the plasticity of each sample by means of a penetrometer (or similar instrument) and plotting these values against the concentration values of corresponding samples, a graph similar to that shown in FIG. 2 may be drawn from which the corrected values may be obtained.

A regional correction may thus be made by areally averaging any one of the various correction factors relating to composition, surface area or plasticity. These averages may comprise samples taken within an area of several square miles or more.

Although the invention has been described in terms of a preferred embodiment, nevertheless changes and modifications obvious to those skilled in the art are deemed to be within the spirit, scope and contemplation of the invention in its broadest aspect.

What is claimed is:

1. In the art of geochemical exploration, a process directed toward locating areas capable of producing petroleum materials by the initial elimination of areas which characteristically are indicative of negative qualifications as anomalies which comprises: testing a plurality of soil samples obtained from spaced portions of an area under geochemical exploration to determine detector concentration values therefor, identifying for each of the soil samples a characteristic soil property indicative of its retentivity of detector concentration values, recording a value for each of the said soil samples indicative of its identified characteristic soil property for retentivity and its detector concentration value, statistically analyzing the recorded values for the soil samples to establish a mean background value, eliminating those of the soil samples which are characteristically indicative of negative qualifications as anomalies by having recorded values substantially the same as the mean background value, and locating the portions of said area corresponding to the remaining soil samples in which the presence of detector concentration values having their background values eliminated are characteristically indicative as anomalies.

2. The process of claim 1 wherein the characteristic soil property is the ratio of the lamellar structure to granular structure.

3. The process of claim 1 wherein the characteristic soil property is the plasticity.

4. The process of claim 1 wherein the characteristic soil property is the surface area.

References Cited in the file of this patent
UNITED STATES PATENTS
2,590,113    McDermott _____ Mar. 25, 1952
OTHER REFERENCES
Beerstecher: Petroleum Microbiology, pp. 212–215, Elsevier Press, Inc., New York, 1954.